United States Patent [19]

Nixon

[11] 4,121,675
[45] Oct. 24, 1978

[54] APPARATUS FOR GRIPPING A SHAFT OR THE LIKE

[75] Inventor: Jeddy D. Nixon, Houston, Tex.

[73] Assignee: Maurer Engineering, Inc., Houston, Tex.

[21] Appl. No.: 729,819

[22] Filed: Oct. 4, 1976

[51] Int. Cl.² .................... E21B 17/00; E21C 9/00
[52] U.S. Cl. .................... 175/325; 24/263 D; 267/147; 308/4 A; 403/227; 403/372; 248/356
[58] Field of Search ........... 403/227, 372, 370, 374; 267/147; 308/4 A; 166/173, 176; 175/325; 64/27 R, 27 F; 24/263 DD; 285/342, 356, 382.7; 188/67; 279/102, 103, 95, 96; 248/356; 140/89, 71 R; 245/1, 7, 8

[56] References Cited

U.S. PATENT DOCUMENTS

| | | | |
|---|---|---|---|
| 1,974,546 | 9/1934 | Shipley | 308/4 A |
| 2,066,270 | 12/1936 | Hubbard | 285/342 X |
| 2,564,302 | 8/1951 | Fraser | 285/342 X |
| 3,033,622 | 5/1962 | Renner | 403/372 X |
| 3,390,709 | 7/1968 | Schmidt | 267/147 X |
| 3,666,000 | 5/1972 | Blech et al. | 267/147 X |
| 3,747,700 | 7/1973 | Rilling | 175/325 X |

*Primary Examiner*—Stephen J. Novosad
*Assistant Examiner*—Richard E. Favreau
*Attorney, Agent, or Firm*—Jennings B. Thompson

[57] ABSTRACT

Apparatus is disclosed that includes a housing through which extends a shaft, such as a drill string. A body of wire mesh is carried by the housing and located between the housing and the drill string. The wire mesh is compressed to cause it to expand laterally into engagement with the housing and drill string to hold the housing from movement relative to the drill string, to attach, for example, a stabilizer to the drill string, or to support at least a portion of the weight of the drill string.

6 Claims, 9 Drawing Figures

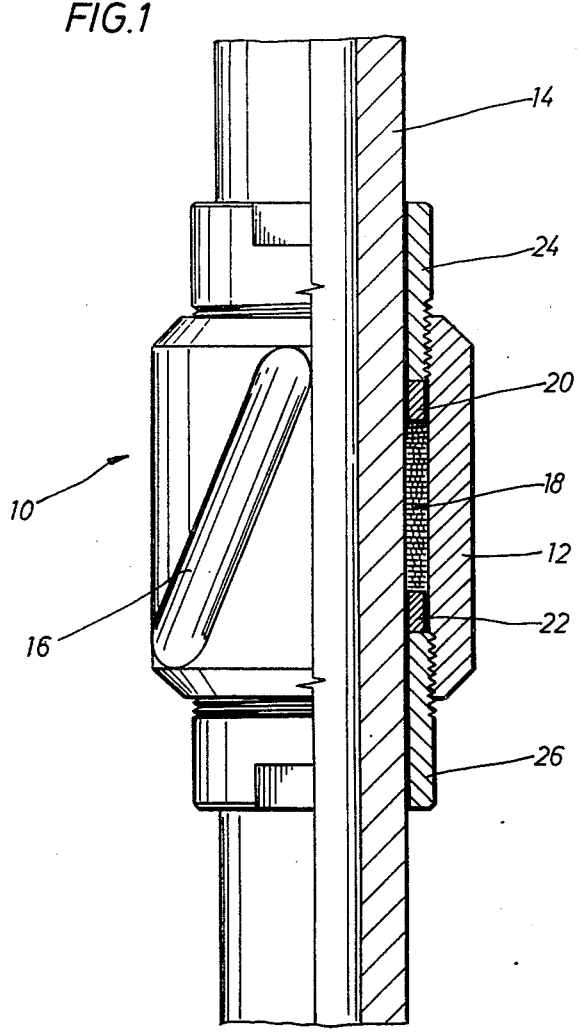
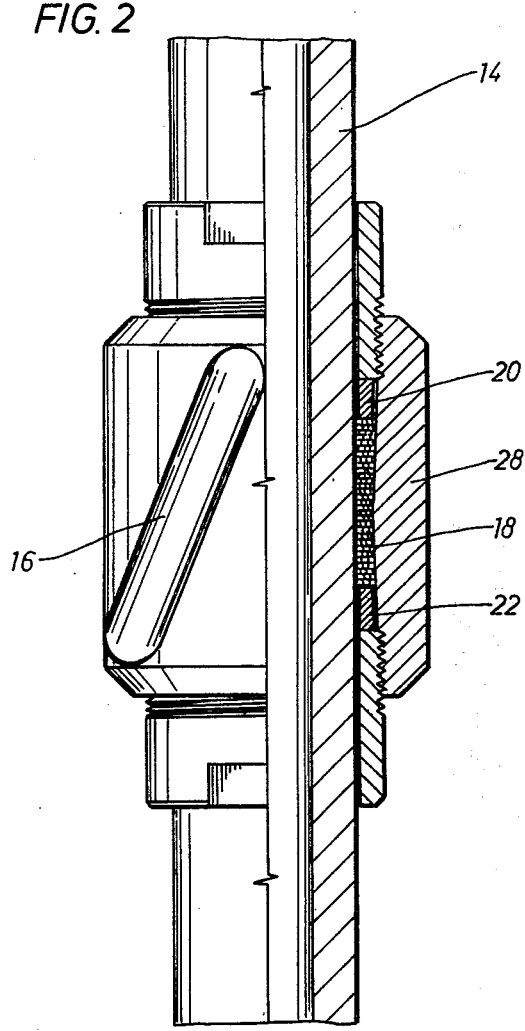
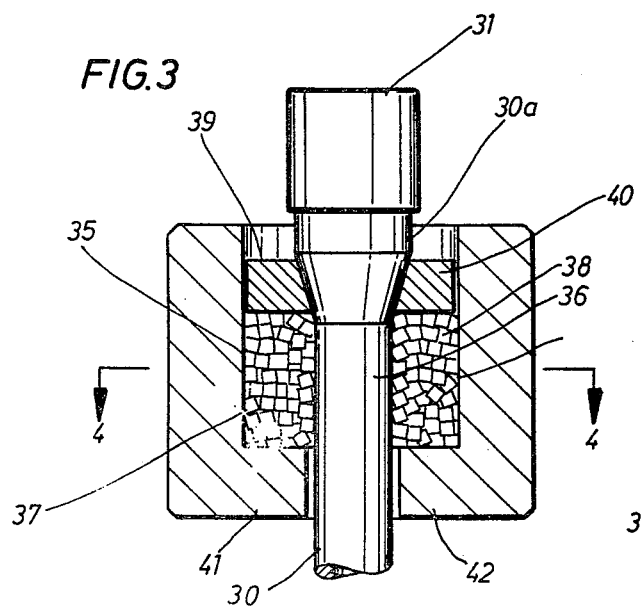
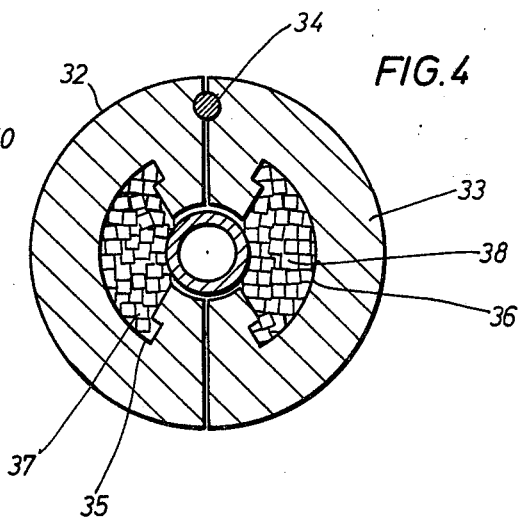

APPARATUS FOR GRIPPING A SHAFT OR THE LIKE

This invention relates generally to apparatus for gripping a shaft or the like, such as a drill string. In one of its aspects, it relates to apparatus for attaching a device to the outside of a shaft to mount the device for movement with the shaft. Another aspect of this invention relates to apparatus for gripping a shaft to prevent relative movement between the apparatus and shaft. In yet another aspect, this invention relates to apparatus for supporting at least a portion of the weight of a generally vertical shaft, such as a drill string.

In the broad aspect of this invention, the apparatus of the invention provides means for attaching one member, such as a housing or body, to a shaft that extends through the body or housing. As such, it has many applications. For example, it can be used to attach a stabilizer body to the outside surface of a drill string at any selected point along the drill string. This is important since it allows the stabilizer to be placed the desired distance above the bit. This is not always possible with conventional stabilizers that have to be installed in the drill string at a joint between adjacent sections of drill pipe or drill collars.

The invention can also be used advantageously in supporting a string of pipe. As wells are being drilled deeper and deeper, the weight of the pipe strings involved increases accordingly, which has created problems in supporting such strings. Pipe strings have heretofore been supported by elevators that engage the downwardly facing shoulders provided by the collars, tool joint, or the upset on the top joint of pipe in the string. Rotary slips have heretofore supported pipe strings with wedge-like slip members. When the weight of the pipe strings began to exceed what would be supported by a collar, tool joint, or upset, elevators employing slip members, called "spiders", were used since the slip members usually can support more weight without damaging the pipe than can the collar-upset type becuase they act over a greater area. They do, however, exert a crushing force on the pipe and, therefore, there is a limit to the length of any given pipe string that can be so supported.

Therefore, it is an object of this invention to provide apparatus for attaching or gripping the surface of a shaft or tubular member to attach a device or body to the shaft or tubular member in a new and novel manner.

It is another object of this invention to provide apparatus for gripping a shaft or tubular member that can be used to support at least a portion of the weight of the tubular member.

It is another object of this invention to provide apparatus for supporting a pipe string that supports a portion of the weight of the pipe through the collar or upset of the upper joint and a portion of the weight of the pipe through a slip-type member.

These and other objects, advantages and features of this invention will be apparent to those skilled in the art from a consideration of this specification including the attached drawings and appended claims.

In the drawings:

FIG. 1 is a view, partly in section and partly in elevation, of a stabilizer embodying the apparatus of this invention mounted on a drill string;

FIG. 2 is a view of an alternate embodiment of the stabilizer of FIG. 1 also partly in section and partly in elevation;

FIG. 3 is a cross-sectional view of apparatus embodying this invention to support the weight of a string of drill pipe;

FIG. 4 is a view taken along line 4—4 of FIG. 3;

Figure 5:
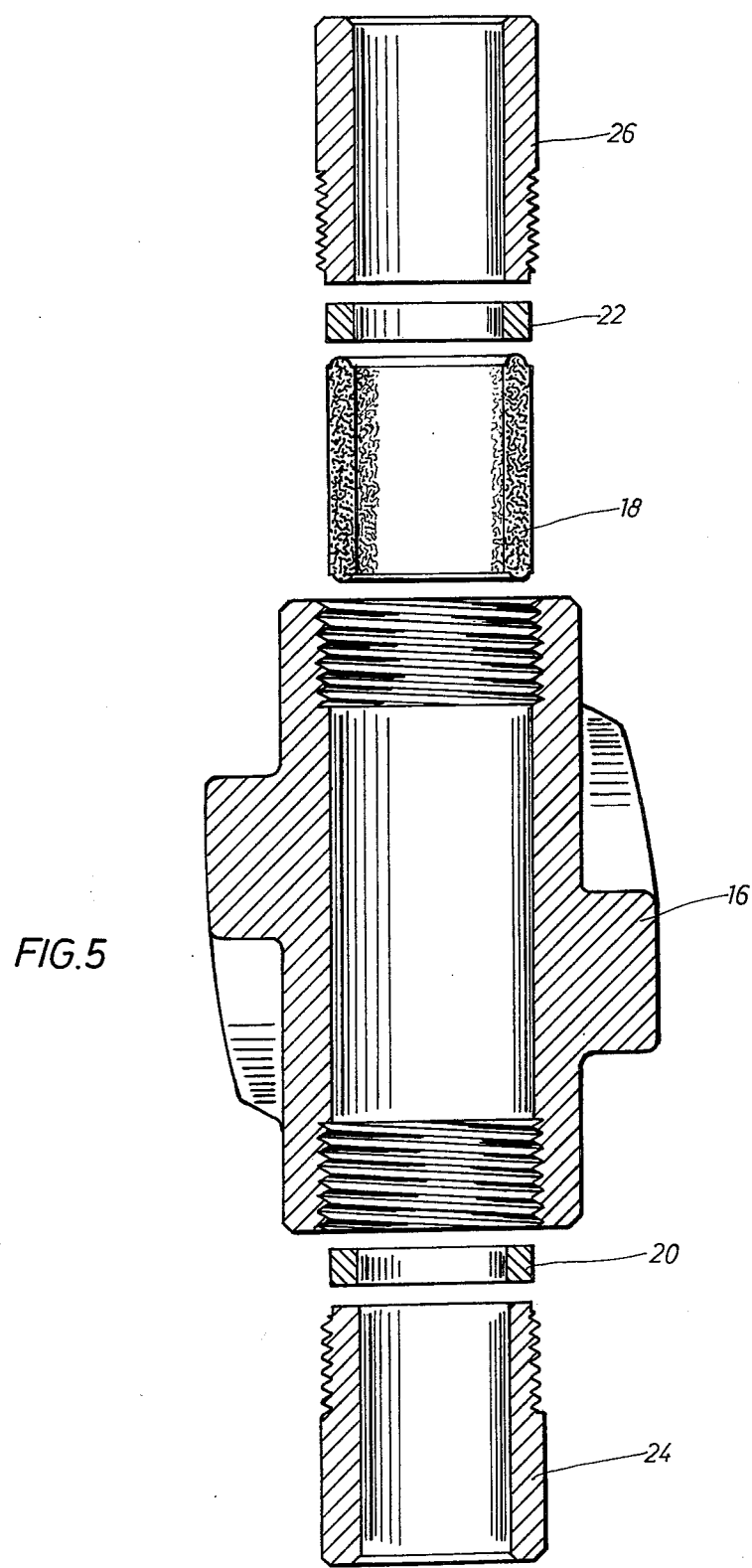
FIG. 5 is an exploded view of the elements that make up the stabilizer of FIG. 1.
Figure 6:
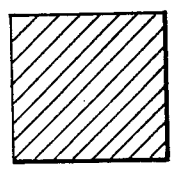
Figure 7:
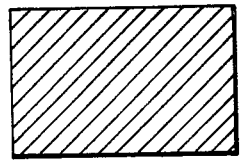
Figure 8:
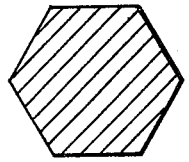
Figure 9:
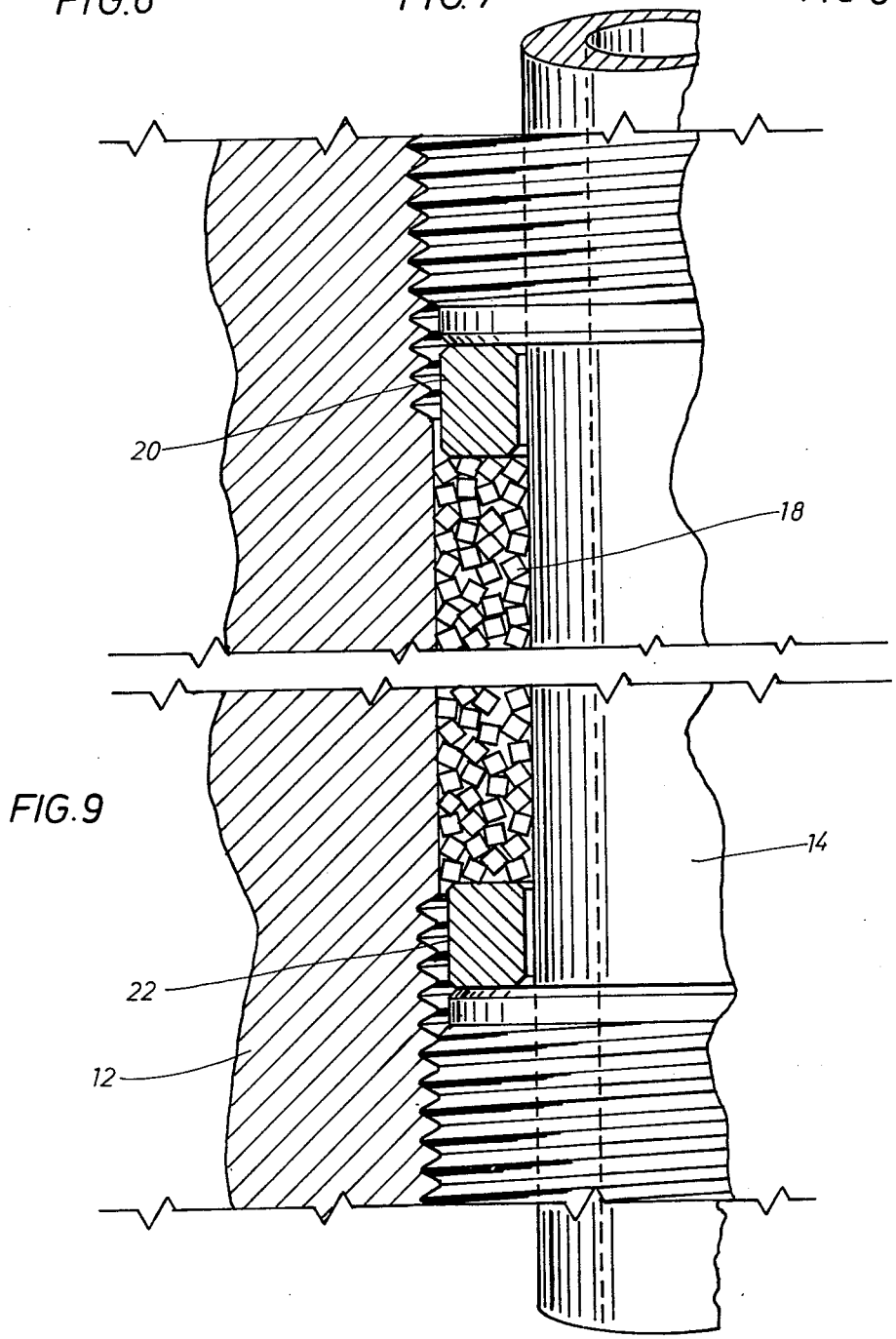

FIGS. 6, 7, and 8 are cross-sectional views of various wire configurations that can be employed to form the wire mesh portion of the apparatus of this invention; and FIG. 9 is a view on an enlarged scale of the gripping elements of the stabilizer of FIG. 1 located on a drill string.

The apparatus of this invention can be used to grip the outside surface of any shaft, whether tubular or solid. It will be described in detail, however, as used to grip the outside surface of tubular members that make up drill strings or tubing strings used in oil and gas well drilling or production.

As explained above, the apparatus of this invention can be used to grip a shaft to attach a member to the shaft, such as to attach a stabilizer body to a drill string. In FIG. 1, stabilizer 10 includes stabilizer body 12 through which drill string 14 extends. Attached to the outside surface of body 12 are stabilizer ribs 16 which, in the embodiment shown, are inclined from the vertical, but which could be vertical or spiral, as desired.

The bore through housing or body 12 is larger in diameter than the outside diameter of drill string 14 to provide a cavity or annular space in which is located a body or mass of wire mesh, indicated by the number 18. Preferably, the wire employed to make up the wire mesh is non-circular, and also, preferably, is provided with flat sides such as those shown in FIGS. 6, 7, and 8 so that there will be relatively sharp edges on the wire. This wire is woven into a cylindrical shape and then is compressed to increase its density by reducing the size of the voids in the mesh itself. The mesh is not compressed to 100% density so that it remains resilient and will act as a spring and also, so that it can be further compressed axially. The mesh is formed into a cylindrical mass that can slide over the outside surface of the portion of the drill string upon which the stabilizer is to be mounted. The cylindrical mass has a wall thickness such that it substantially fills the annular space between the pipe string and the body of the stabilizer.

As stated above, the wire mesh is formed into a cylindrical shape and is compressed to increase its density by reducing the size of the cavities between the wires forming the mesh. During the compression, the stress in the wires exceeds the yield point of the material so that the wires are permanently deformed into the desired shape. The wire mesh is left with some porosity, i.e., it is not compressed to 100% density, where "density" is the percentage of the mass that is occupied by the wire. In the practice of this invention, it is contemplated that the preferred density will range between 30–70%. The wire mesh mass 18, then, will have resiliency and will act as a spring when further compressed axially. Further, when compressed axially the mesh will move laterally into engagement with the outside surface of the drill string and the bore of the stabilizer body.

Means are provided to compress the wire mesh. In the embodiment shown in FIGS. 1, 2, 5 and 9, annular compression rings 20 and 22 are positioned in the bore of the body of the stabilizer on opposite ends of the body or mass of wire mesh. Each end of the bore of the stabilizer body is provided with threads that engage compression nuts 24 and 26. When the nuts are rotated relative to the body, the nuts exert an axial compressive force on wire mesh 18 through compression rings 20 and 22. As explained above, this causes the wire mesh to expand laterally into frictional engagement with the outside surface of the drill string and the inside bore of the body. Thus, the body of wire mesh will be forced to grip the two members with sufficient force to hold stabilizer body 12 from movement relative to the drill pipe or drill string as it is moved into and out of a well bore and as it is rotated while in the well bore during drilling operations.

To remove the stabilizer, the force applied to the mesh by nuts 24 and 26 is relieved. The wire mesh will have sufficient resiliency to return at least part way to its original shape to the extent that the stabilizer can be removed from the drill pipe or repositioned on the drill pipe.

FIG. 9 shows a wire mesh made up of wires of square cross section. The size of the wires is enlarged in the Figure. It is contemplated that the wire actually used in the practice of this invention will probably have a diameter of around 0.013 inches in diameter. By using relatively small wire and fairly dense wire mesh, it will increase substantially the number of points engaged on the surface of the members by the wire and improve the distribution of the load between the wire and the members it supports.

The stabilizer shown in FIG. 2 is identical with the stabilizer previously described and shown in FIG. 1, except that the internal bore of body 28 is tapered inwardly from both ends toward the middle. As rings 20 and 22 exert an axial compressive load on body 18 of wire mesh, and as the wire mesh is moved toward the middle of the bore due to the compressive load, the tapered bore of body 28 will tend to urge the wire mesh laterally into engagement with the outside surface of drill string 14.

As explained above, many strings of drill pipe, casing, and tubing are reaching lengths where neither the collar or upset type elevators nor rotary slips or slip-type elevators can support the weight of the string without damaging the joint they engage. It is one of the features and advantages of this invention to provide apparatus for supporting the weight of a string of pipe by supporting at least a portion of the weight of the string with a slip-type action and supporting a portion of the weight of the string by a conventional collar or upset type surport.

As shown in FIG. 3, upper joint 30 of the pipe string is shown as external upset drill pipe. The taper on upset portion 30a is generally approximately 18 degrees. Attached to the upset is tool joint 31. The elevators shown include two sections 32 and 33. The sections are connected for pivotal movement by pivot pin 34. The structure of elevators is well known and the housing or two sections of the elevators that generally engage the pipe are not shown in any detail. The two sections are pivoted together, as explained above, by pin 34 so that this type elevator is generally known as the center-latch type. The means for latching the two sections together around the drill string are not shown again because this is conventional and is well known.

Elevator sections 32 and 33 are provided with cavities 35 and 36, in which are located bodies 37 and 38 of wire mesh. Positioned on top of the bodies of wire mesh are split rings 39 and 40. The rings have tapered surfaces designed to engage the tapered portion of upset 30a on joint 30 of drill pipe extending through the elevators. These rings are supported only by the bodies of wire mesh so that as the weight of the drill string is transferred to rings 39 and 40 they will exert a compressive load on the bodies of wire mesh positioned below them. This compressive force will also be transmitted to inwardly extending flanges 41 and 42 of the two sections of elevator housing. The downward compressive force exerted on the bodies of wire mesh will cause them to move laterally and into frictional engagement with the outside surface of joint 30 of the drill pipe and the adjacent surfaces of cavities 35 and 36. This will create a frictional force resisting downward movement of the drill pipe and, therefore, a portion of the weight of the drill string will be supported by the frictional force developed between the two elevator sections and the pipe by the two bodies of wire mesh. The remaining portion of the weight of the pipe is supported on the upset by rings 39 and 40, which transmit this portion directly into flanges 41 and 42 of the elevator body through the two bodies of wire mesh. Thus, a portion of the weight of the pipe string is supported by slip-type support provided by the bodies of wire mesh and a portion of the weight is supported through the upset of the drill pipe. In this way, the compressive force exerted on the pipe by the wire mesh is not as great as it would be if the frictional grip of the wire mesh alone supported the weight of the drill pipe. Alternatively, the force exerted on the upset is reduced by the amount supported by the wire mesh. Thus, with the apparatus of this invention, long, heavy pipe strings can be supported with a substantial reduction in the possibility of damaging the pipe.

The pipe supporting feature of this invention has been described specifically embodied in pipe supporting elevators. The same arrangement could be used in a spider that sits on the rotary table.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having now been described, what is claimed is:

1. Apparatus for gripping the surface of a shaft or the like comprising a housing through which the shaft extends, a body of wire mesh carried by the housing, and means to compress the body in a direction parallel to the shaft to move the wire mesh into engagement with the shaft and the housing to hold the shaft and housing from relative movement.

2. The apparatus of claim 1 in which the housing is an annular member having outwardly extending stabilizer ribs mounted thereon and in which the shaft is a pipe string.

3. The apparatus of claim 1 in which the housing includes two sections for encircling the tubular member, and in which said body of wire mesh includes two portions, with one portion carried by each of the housing sections.

4. A stabilizer for mounting on the outside surface of a drill string comprising a body having a longitudinally extending opening through which the drill string extends, said body having outwardly extending ribs to engage the wall of a well bore, an annular mass of woven wire mesh located between the opening through the body and the drill string, and means for compressing the annular mass axially to force the wire mesh laterally into frictional engagement with the body and the drill string to hold the body from movement relative to the drill string.

5. The stabilizer of claim 4 in which the bore is tapered adjacent the mass of wire mesh to urge the wire mesh laterally toward the drill string when compressed axially.

6. Pipe supporting apparatus comprising a housing of two sections pivotally connected together for movement into position to at least partially encircle a pipe member, a body of wire mesh carried by each section, and means for transmitting the weight of the pipe to the bodies of wire mesh to compress the wire mesh and move the wire mesh into engagement with the pipe member to support a portion of the weight of the pipe by the friction between the wire mesh and the pipe member.

* * * * *